(12) United States Patent
Scheuer et al.

(10) Patent No.: US 8,293,147 B2
(45) Date of Patent: Oct. 23, 2012

(54) LASER-WRITABLE POLYMER MATERIAL

(75) Inventors: Gerhard Scheuer, Nieder-Olm (DE);
Joachim Markmann, Dorsheim (DE);
Gunnar Buehler, Nickenich (DE);
Hans-Dieter Naegerl, Dudenhofen (DE); Thomas Futterer, Ingelheim (DE); Ruediger Wissemborski, Gau-Algesheim (DE)

(73) Assignee: Chemische Fabrik Budenheim KG, Budenheim (DE)

( * ) Notice: Subject to any disclaimer, the term of this patent is extended or adjusted under 35 U.S.C. 154(b) by 75 days.

(21) Appl. No.: 12/310,087

(22) PCT Filed: Jul. 23, 2007

(86) PCT No.: PCT/EP2007/057551
§ 371 (c)(1),
(2), (4) Date: Nov. 23, 2009

(87) PCT Pub. No.: WO2008/019925
PCT Pub. Date: Feb. 21, 2008

(65) Prior Publication Data
US 2010/0140571 A1    Jun. 10, 2010

(30) Foreign Application Priority Data
Aug. 14, 2006 (DE) .......................... 10 2006 038 043

(51) Int. Cl.
*G02B 5/23* (2006.01)
*G21F 1/10* (2006.01)
*C08K 3/32* (2006.01)

(52) U.S. Cl. ........ 252/586; 430/200; 430/269; 430/292; 430/945; 523/137; 524/417; 524/418; 524/423; 524/430

(58) Field of Classification Search ................... 252/586; 522/2, 81, 82, 83; 523/201, 137; 524/500, 524/430, 424, 423, 417, 418, 409, 405, 101, 524/102, 103; 525/165, 166; 428/404, 407; 430/321, 200, 292, 269, 311, 945; 369/275.4, 369/275.3, 279
See application file for complete search history.

(56) References Cited

U.S. PATENT DOCUMENTS

| 5,063,137 | A | | 11/1991 | Kiyonari et al. |
| 5,489,639 | A | * | 2/1996 | Faber et al. .................... 524/417 |
| 2006/0074165 | A1 | * | 4/2006 | Gelissen et al. .............. 524/430 |
| 2009/0124735 | A1 | * | 5/2009 | Futterer et al. ................ 524/148 |

FOREIGN PATENT DOCUMENTS

| DE | 19905358 | A1 | | 8/2000 |
| DE | 10034472 | A1 | * | 1/2002 |
| DE | 10034472 | A1 | | 1/2002 |
| DE | 10053639 | A1 | | 5/2002 |
| DE | 202004016383 | U1 | | 1/2005 |
| DE | 102004051457 | A1 | | 9/2005 |
| DE | 102004050480 | A1 | | 4/2006 |
| DE | 102004050481 | A1 | | 4/2006 |
| DE | 102004050571 | A1 | | 4/2006 |
| EP | 0190997 | A1 | | 8/1986 |
| EP | 0105451 | B1 | | 3/1988 |
| EP | 0027532 | B1 | | 5/1988 |
| EP | 0330869 | A1 | | 9/1989 |
| EP | 0400305 | A2 | | 12/1990 |
| EP | 0542115 | A1 | | 5/1993 |
| EP | 0764683 | A1 | | 3/1997 |
| EP | 0797511 | A1 | | 10/1997 |
| EP | 0808866 | A2 | | 11/1997 |
| EP | 0753536 | B1 | | 5/2000 |
| EP | 1190988 | B1 | | 9/2008 |
| WO | WO 98/58805 | | | 12/1998 |
| WO | WO 99/55773 | | | 11/1999 |
| WO | WO 01/00719 | A1 | | 1/2001 |
| WO | WO 0178994 | A1 | | 10/2001 |
| WO | WO 2005/090056 | A1 | | 9/2005 |
| WO | WO 2006/042833 | A1 | | 4/2006 |

* cited by examiner

*Primary Examiner* — Bijan Ahvazi
(74) *Attorney, Agent, or Firm* — Michael L. Dunn

(57) ABSTRACT

A laser-writable molding material containing A) at least one polymer material or at least one precursor compound which can be polymerised to give a polymer material, and B) a particulate salt-like compound or a mixture of particulate salt-like compounds, which under the influence of laser light changes its color or leads to a color change in the component A). In order to enlarge the range of matrix materials hitherto available for laser writing and to overcome the disadvantages of the previously used writing procedures for such matrix materials, the laser-writable molding material according to the invention is characterised in that the at least one polymer material of the component A) is selected from polymer compounds having siloxane crosslinking units.

15 Claims, No Drawings

LASER-WRITABLE POLYMER MATERIAL

BACKGROUND OF THE INVENTION

The present invention concerns a laser-writable molding material containing at least one polymer material or at least one precursor compound which can be polymerised to give a polymer material, and a particulate salt-like compound or a mixture of particulate salt-like compounds, which under the influence of laser light changes its color or leads to a color change in the polymer material. The invention further concerns moldings produced from such laser-writable molding materials.

Research has been concerned for a prolonged period of time with the development of laser-writable plastic materials as laser light can be focused to form very fine beams, which there is a wish to use for producing text and image on plastic articles. Most plastic materials as such however are not writable as they do not absorb laser light. Therefore, particulate light-sensitive compounds referred to as pigments are added to the plastic material, such compounds leading to a local change in color under the influence of laser light. That change in color can result from the fact that the pigment itself, with the absorption of laser light, changes its color due to chemical reaction, breakdown or physical conversion into a different modification, or the light energy absorbed by the pigment is transferred on to the adjacent plastic material and breaks it down or causes a color change in some other fashion.

There are many different pigments which have been described and investigated for that purpose in the past such as for example a very wide range of different metal oxides, metal phosphates, metal stannates and metal salts of organic anions.

EP-A-190 997 discloses a method of laser marking in which inter alia titanium oxide and antimony oxide are incorporated as pigments into a polymer material. EP-A-330 869 discloses the use of titanium oxide white pigment. EP-A-400 305 and EP-A-542 115 describe the use of copper hydroxide phosphate or molybdenum-(IV)-oxide as laser pigments. U.S. Pat. No. 5,063,137 discloses inter alia the use of water-free metal phosphates and phosphoric acid-based glasses. EP-A-797 511 describes the use of wafer pigments with a layer of doped tin oxide. U.S. Pat. No. 5,489,639 describes the use of selected copper salts (phosphates, sulfates, thiocyanates). EP-A-764 683 discloses the use of copper pyrophosphate hydrate and/or manganese sulfate hydrate as pigments. The use of boric acid anhydride is known from EP-A-808 866. WO-A-98/58805 discloses a series of copper phosphates as laser pigments. WO-A-99/55773 describes inter alia the use of zinc hydroxy stannate and tin (II)-oxalate. DE-A-199 05 358 discloses the use of alkali copper diphosphate. WO-A-01/00719 describes the use of antinomy oxide of particle sizes above 0.5 µm. EP-A-1 190 988 discloses the use of given bismuth mixed oxides. WO-A-01/78994 proposes the use of copper fumarate, copper maleate and mixtures thereof DE-A-100 53 639 discloses the use of selected salts, in particular various cobalt and iron phosphates. DE-A-100 34 472 describes the use of particles surface-modified with given silicon compounds. EP-A-753 536 describes the use of at least two kinds of metal oxides. EP-A-105 451 describes polyphenylene sulfide molding materials which for laser marking have been modified with selected additives, for example with the combination of lead chromate and lead molybdate, with nickel-antimony-titanate or with cobalt-zinc-silicon. DE 102004050481 discloses the use of tin phosphate as a pigment for laser writing. DE 102004050480 describes the use of a salt-like compound with at least two different metal cations as a laser pigment. DE 102004050571 describes the use of a salt-like compound or a mixture of salt-like compounds, which contains at least tin as a divalent cation and optionally further cations and oxoanions, anions of organic carboxylic acids or anions of carbonic acid.

Hitherto primarily thermoplastic materials have been used as plastic materials for laser writing such as polyethylene, polypropylene, polypropylene-polyethylene copolymers, polyamide, polyester, polyphenylene oxide, polyacetal, polyethylene terephthalate, polybutylene terephthalate, polymethacrylate, polyoxymethylene, polyvinyl acetal, polystyrene, acryl-butadiene-styrene, acryl-nitrile-styrene-acryl ester, polycarbonate, polyether sulfone, polyethylether ketone, polyvinyl chloride and thermoplastic polyurethane. Besides their advantages mechanical, thermal, electrical and chemical properties thermoplastic materials are also highly suitable for the incorporation of pigments for laser writing. Examples of use are uses in the domestic goods area, in relation to keyboards and in the electronic field, as described for example in EP-A-027 532.

In regard to the writability of thermosetting materials and elastomers by means of laser light, it is hitherto less known. Writing in respect of thermostable resins such as for example phenol resins, epoxy resins and other thermosetting materials has hitherto been effected with conventional printing methods such as ink jet printing, screen printing, tampon printing and so forth. The ink jet technology is usually employed when writing on silicone sheaths of cables. The conventional printing methods suffer from the disadvantage that the printing is not permanent and is easily removed by moisture, solvent or abrasion.

BRIEF SUMMARY OF THE INVENTION

The object of the present invention was that of providing novel laser-writable molding materials and enlargement of the range of matrix materials hitherto available for laser printing as well as overcoming the disadvantages of the hitherto used writing procedures for such matrix materials.

The object is attained by a laser-writable molding material containing

A) at least one polymer material or at least one precursor compound which can be polymerised to give a polymer material, and B) a particulate salt-like compound or a mixture of particulate salt-like compounds, which under the influence of laser light changes its color or leads to a color change in the component A), wherein the at least one polymer material of the component A) is selected from polymer compounds having siloxane crosslinking units.

DETAILED DESCRIPTION OF THE INVENTION

In a preferred embodiment of the invention the at least one polymer material of the component A) is selected from silicones, silicone rubbers, silicone resins, silicone-modified thermosetting materials, silicone-modified elastomers, siloxane crosslinking units-bearing copolymers and mixed polymers and mixtures of the aforementioned with other polymer materials.

Quite particularly preferably the at least one polymer material of the component A) is selected from silicones, silicone rubbers and silicone resins.

In a further preferred embodiment of the invention the proportion by weight of component A) is between 40 and 99.95% by weight, preferably between 80 and 99.5% by weight, particularly preferably between 95 and 99% by weight, with respect to the total mass of the molding material.

In a further preferred embodiment of the invention the salt-like compound or compounds of the component B) is/are selected from metal phosphates and/or metal phosphites.

In a further preferred embodiment of the invention the salt-like compound or compounds of the component B) is/are selected from orthophosphates, polyphosphates, pyrophosphates and hydroxyphosphates.

In a further preferred embodiment of the invention the salt-like compound or compounds of the component B) is/are selected from copper phosphates, tin phosphates, iron phosphates, nickel phosphates, molybdenum phosphates, cobalt phosphates, manganese phosphates and antimony phosphates and particularly preferably from copper phosphates, tin phosphates and iron phosphates.

In a further preferred embodiment of the invention the salt-like compound or compounds of the component B) is/include copper hydroxyphosphate [CHP; $Cu_4(OH)_2(PO_4)_2$].

In a further preferred embodiment of the invention the salt-like compound or compounds of the component B) is/are included in an amount of between 0.01 and 10% by weight, preferably between 0.1 and 5% by weight, particularly preferably between 0.3 and 2% by weight, with respect to the total mass of the molding material.

In a further preferred embodiment of the invention the salt-like compound or compounds of the component B) has/have a mean particle size (D50) of less than 50 μm, preferably less than 15 μm, particularly preferably less than 10 μm.

In a further preferred embodiment of the invention the molding material contains further usual additives as component C).

Particularly preferably the molding material contains as component C) at least one of the following additives: stabilisers for improving the resistance to the action of light, UV radiation and weathering, stabilisers for improving thermal and thermo-oxidative resistance, stabilisers for improving hydrolytic resistance, stabilisers for improving acidolytic resistance, lubricants, mold removal aids, coloring additives, crystallisation-regulating substances and nucleation agents, flame-proofing agents, impact toughness modifiers, fillers and/or plasticisers.

The invention also concerns a molding which can be obtained by shaping of a laser-markable molding material in accordance with this invention.

The invention further includes a laser-marked molding which can be obtained by irradiating a molding comprising a laser-markable molding material in accordance with this invention with laser light.

The invention further concerns the use of at least one polymer material or at least one precursor compound which can be polymerised to give a polymer material in accordance with the definition in accordance with the invention of the component A) for the production of a laser-writable molding material.

The invention further concerns the use of a particulate salt-like compound or a mixture of particulate salt-like compounds in accordance with the definition in accordance with the invention of the component B) for the production of a laser-writable molding material.

The choice of the component B) is generally such that it has a level of absorption which is as great as possible in the wavelength range of the available laser light. The wavelength ranges of the laser light used are basically not subject to any limitations. Suitable lasers generally involve a wavelength in the range of between 157 nm and 10.6 μm, preferably in the range of between 532 nm and 10.6 μm. Here $CO_2$ lasers (10.6 μm) and NdYAG lasers (1064 nm) or pulsed UV lasers are to be mentioned by way of example. Typical excimer lasers involve the following wavelengths: F2 excimer lasers (157 nm), ArF excimer lasers (193 nm), KrCl excimer lasers (222 nm), KrF excimer lasers (248 nm), XeCl excimer lasers (308 nm), XeF excimer lasers (351 nm), frequency-multiplied NdYAG lasers with wavelengths of 532 nm (frequency-doubled), 355 nm (frequency-tripled) or 265 nm (frequency-quadrupled). NdYAG lasers (1064 and 532 nm respectively) and $CO_2$ lasers are particularly preferably used.

The energy densities of the lasers used according to the invention are generally in the range of between 0.3 mJ/cm$^2$ and 50 J/cm$^2$, preferably between 0.3 mJ/cm$^2$ and 10 J/cm$^2$. When using pulsed lasers the pulse frequency is generally in the range of between 1 and 30 kHz.

The term 'salt-like compound' is used here in accordance with the invention to denote compounds which in water at least partially disassociate into cations and anions or comprise an acid residue and a base residue.

The term 'particulate' in connection with a salt-like compound is intended to mean that the compound is present in the form of fine solid particles.

The 'particle size' is determined for the purposes of the present invention by usual methods such as light scattering, microscopy or electron microscopy, counting flow measurements at thin gaps, sedimentation processes or further commercially available procedures. Quantitative information relates to the mean particle size (D50). The size of the primary particles is in the nanometer through micrometer range.

Laser-writable molding materials in accordance with the present invention are distinguished in that, upon irradiation with intensive light, preferably from a conventional laser light source, a change in color in comparison with the non-exposed matrix occurs at the exposed location. That color difference can be detected as locally differing light density, locally differing color values, for example in the CIELab system, or as locally differing color values in the RGB system. Those effects can occur with different light sources.

When reference is made herein to a 'color change', that can be a change-over from one color shade to another, such as for example from yellow to red or from transparent to black. In accordance with the invention however this term is also used to mean a change in brightness, for example from light brown to dark brown and/or a color change in the plastic material.

Thermosetting Materials

While thermoplastic materials do not have any crosslinking locations and can therefore be melted elastomers and thermosetting materials cannot be melted because of their crosslinking and break down after the decomposition temperature is exceeded (pyrolysis). Thermosetting materials are plastic materials which can no longer be shaped after hardening. They involve hard, glass-like polymer materials which are three-dimensionally firmly crosslinked by way of chemical primary valence bonds. Unlike elastomers thermosetting materials are substantially more greatly crosslinked, the reason for this lying with their production process using polycondensation and polyaddition.

Silicones

Silicones are a group of synthetic polymers in which silicon atoms are linked by way of oxygen atoms (siloxane units) to form molecular chains and/or in network-like fashion. By virtue of their typically inorganic structure on the one hand and their organic residues on the other hand silicones occupy a position intermediate between inorganic and organic compounds, in particular between silicates and organic polymers. They are hybrids to a certain degree and have a unique range of properties not achieved by any other plastic material.

Silicone caoutchoucs and silicone rubber are generally of a density of between 1.1 and 1.3 g/cm³ and are elastic at between −60° C. and 200° C. (special types between −90° C. and 250° C.). These involve materials which can be converted into the rubber-elastic state and which as base polymers contain polydiorganosiloxanes which have groups accessible to crosslinking reactions. Predominantly hydrogen atoms, hydroxyl groups and vinyl groups are considered as such, which are at the chain ends but which can also be incorporated into the chain. Fillers are incorporated into that system, as reinforcing agents, the nature and amount of which markedly influence the mechanical and chemical behaviour of the vulcanisates. Silicone caoutchouc and silicone rubber can be colored by inorganic pigments.

A distinction is drawn between hot-vulcanising and cold-vulcanising silicone caoutchoucs (in English: high/room temperature vulcanising=HTV/RTV). The HTV silicone caoutchoucs generally represent plastically deformable materials which are in fact still capable of flow and which contain highly disperse silicic acid as well as organic peroxides as crosslinking catalysts and after vulcanisation at temperatures of greater than 100° C. give heat-resistant silicone elastomers (silicone rubber) which are elastic at between −100° C. and +250° C. and which are used for example as sealing, damping, electrical insulating materials, cable sheaths and the like.

Another crosslinking mechanism involves an addition, mostly catalysed by noble metal compounds, of Si—H groups to silicon-bound vinyl groups which are both incorporated into the polymer chains or at the end thereof. A liquid caoutchouc technology (LSR=liquid silicone rubber) has become established since 1980, in which two liquid silicone caoutchouc components are vulcanised by way of addition crosslinking in automatic injection molding equipment. In regard to the cold-hardening or RTV silicone caoutchouc materials a distinction can be drawn between one-component and two-component systems. The first group (RTV-1) polymerises slowly at room temperature under the influence of air humidity, wherein crosslinking is effected by condensation of SiOH groups, with the formation of Si—O bonds. The SiOH groups are formed by hydrolysis of SiX groups, a species resulting in an intermediate relationship from a polymer with terminal OH groups and what is referred to as a crosslinker R—SiX3 (X=—O—CO—CH3, —NHR). In the case of two-component caoutchoucs (RTV-2) for example mixtures of silicic acid esters (for example ethyl silicate) and tinorganic compounds are used as crosslinkers, wherein the formation of an Si—O—Si bridge from Si—OR and Si—OH is effected by alcohol separation, as the crosslinking reaction.

Silicone resins are crosslinked polymethylsiloxanes or polymethylphenylsiloxanes whose elasticity and thermal resistance increase with the content of phenyl groups. Pure methylsilicone resins are relatively brittle and moderately heat-resistant. Long-term thermal resistance of silicone resins is high (180-200° C.), the advantageous dielectric values are substantially temperature-independent up to 300° C. A methylphenylsilicone resin can be loaded at 200° for 10,000 hours, in contrast an epoxy or alkyd resin only for a few hours.

Silicone resins are usually put on the market in precondensed form. In part they are also combined with organic resins, for example alkyd and polyester resins. The term silicone combination resins is also used to denote copolymers of low-molecular, hydroxy-functional silicones with polyesters, alkyd and acryl resins which are processed to afford what is referred to as silicone enamel, a decorative, heat-resistant coating. To produce pressing materials and laminates, silicone resins are mixed with suitable fillers such as glass fibers, quartz dust, mica and so forth, possibly also color pigments. As silicone resins generally have to be condensed (hardened) by means of condensation catalysts and at elevated temperature they can be attributed to the stoving resins. The silicone resin breaks down at temperatures of between 250° C. and 600° C., forming silicic acid. Optionally with the added pigments that gives a resistant, corrosion-protecting surface film.

Further advantages, features and embodiments of the invention are described by reference to the following examples.

EXAMPLES

Example 1

100 g of a self-hardening silicone material (KE-541U from Shin-Etsu Silicones of America Inc, Akron, Ohio, USA) was mixed with 1% by weight of hardener (Varox DBPH-50, C H Erbslöh, Krefeld, DE) and 1% by weight of copper hydroxide phosphate. The material was then hardened at 170° C. for 15 minutes. The hardened molding material was then written with an NdYAG laser (Magic Marker, ACI Laser GmbH, Sommerda, DE) using a wavelength of 1064 nm. The molding material was opaque and the writing dark brown/black and presented a good contrast without substantially altering the inherent color of the matrix. The text was in and under the surface of the silicone matrix and was absolutely abrasion-resistant and resistant to chemical influences.

Example 2

300 g of a self-hardening silicone material (KE-541U from Shin-Etsu Silicones of America Inc, Akron, Ohio, USA) was mixed with 2% by weight of a mixture of equal parts of copper hydroxide phosphate and tritin phosphate. The material was then hardened at 170° C. for 15 minutes. The hardened molding material was then written with an NdYAG laser (Magic Marker, ACI Laser GmbH, Sommerda, DE) using a wavelength of 1064 nm. The molding material was opaque and the writing dark brown and presented a very good contrast without substantially altering the inherent color of the matrix. The text was in and under the surface of the silicone matrix and was absolutely abrasion-resistant and resistant to chemical influences.

Example 3

100 g of a self-hardening silicone material (KE-541U from Shin-Etsu Silicones of America Inc, Akron, Ohio, USA) was mixed with 1% by weight of hardener (Varox DBPH-50, C H Erbslöh, Krefeld, DE) and 1% by weight of tritin phosphate. The material was then hardened at 170° C. for 15 minutes. The hardened molding material was then written with an NdYAG laser (Magic Marker, ACI Laser GmbH, Sommerda, DE) using a wavelength of 1064 nm. The molding material was opaque and the writing dark brown/black and presented an adequate contrast without substantially altering the inherent color of the matrix. The text was in and under the surface of the silicone matrix and was absolutely abrasion-resistant and resistant to chemical influences.

The invention claimed is:

1. A laser-writable molding material consisting essentially of:
Component A) in the amount of 80 to 99.5 percent, by weight of molding material, of at least one polymer material having siloxane crosslinking units selected from the group consisting of silicones, silicone rubbers, silicone resins, silicone-modified thermosetting materials, silicone-modified crosslinked elastomers, siloxane crosslinking units-bearing copolymers, and siloxane crosslinking units-bearing mixed polymers, and Component B) in the amount of 0.01 to 10 percent, by weight of molding material, consisting essentially of a particulate salt-like compound or a mixture of particulate salt-like compounds, which under the influence of laser light leads to a color change in component A), wherein the salt-like compound or mixture of salt-like compounds of component B) has a mean particle size (D50) of less than 50 μm, and Component C) being an additive selected from the group consisting of: stabilizers for improving the resistance to the action of light, UV radiation and weathering, stabilizers for improving thermal and thermo-oxidative resistance, stabilizers for improving hydrolytic resistance, stabilizers for improving acidolytic resistance, lubricants, mold removal aids, coloring additives, crystallization-regulating substances and nucleation agents, flame-proofing agents, impact toughness modifiers, fillers and plasticizers.

2. The laser-writable molding material according to claim 1, wherein the at least one polymer material of the component A) is selected from the group consisting of silicones, silicone rubbers and silicone resins.

3. The laser-writable molding material according to claim 1, wherein the salt-like compound or mixture of salt-like compounds of component B) is selected from the group consisting of metal phosphates, metal phosphites and mixtures thereof.

4. The laser-writable molding material according to claim 1, wherein the salt-like compound or mixture of salt-like compounds of component B) is selected from the group consisting of orthophosphates, polyphosphates, pyrophosphates, hydroxyphosphates and mixtures thereof.

5. The laser-writable molding material according to claim 1, wherein the salt-like compound or mixture of salt-like compounds of component B) is selected from the group consisting of copper phosphates, tin phosphates, iron phosphates, nickel phosphates, molybdenum phosphates, cobalt phosphates, manganese phosphates, antimony phosphates and mixtures thereof.

6. The laser-writable molding material according to claim 1, wherein the salt-like compound or mixture of salt-like compounds of component B) is selected from the group consisting of copper phosphates, tin phosphates and iron phosphates.

7. The laser-writable molding material according to claim 1, wherein the salt-like compound or mixture of salt-like compounds of component B) includes copper (II) hydroxide phosphate (CHP; $Cu_4(OH)_2(PO_4)_2$).

8. The laser-writable molding material according to claim 1, wherein the salt-like compound or mixture of salt-like compounds of component B) is included in an amount of between 0.1 and 5% by weight.

9. The laser-writable molding material according to claim 1, wherein the salt-like compound or mixture of salt-like compounds of component B) is included in an amount of between 0.3 and 2% by weight, with respect to the total mass of the molding material.

10. The laser-writable molding material according to claim 1, wherein the salt-like compound or mixture of salt-like compounds of component B) has a mean particle size (D50) of less than 15 μm.

11. The laser-writable molding material according to claim 1, wherein the salt-like compound or mixture of salt-like compounds of component B) has a mean particle size (D50) of less than 10 μm.

12. A molding which can be obtained by shaping of a laser-markable molding material according to claim 1.

13. A laser-marked molding which can be obtained by irradiating a molding with laser light, which molding comprises a laser-markable molding material according to claim 1.

14. A method for the production of a laser-writable molding material utilizing at least one of a polymer material or a precursor compound which can be polymerized to give a polymer material, in accordance with the definition of the component A) according to claim 1.

15. A method for the production of a laser-writable molding material by incorporating a particulate salt-like compound or a mixture of particulate salt-like compounds in accordance with the definition of component B) according to claim 1.

* * * * *